July 4, 1967
G. R. ISAAC
3,329,319
DEVICE FOR DELIVERING MEASURED QUANTITIES
OF FLUENT MATERIAL HAVING A
DOUBLE ENDED EJECTOR
Filed Aug. 9, 1965
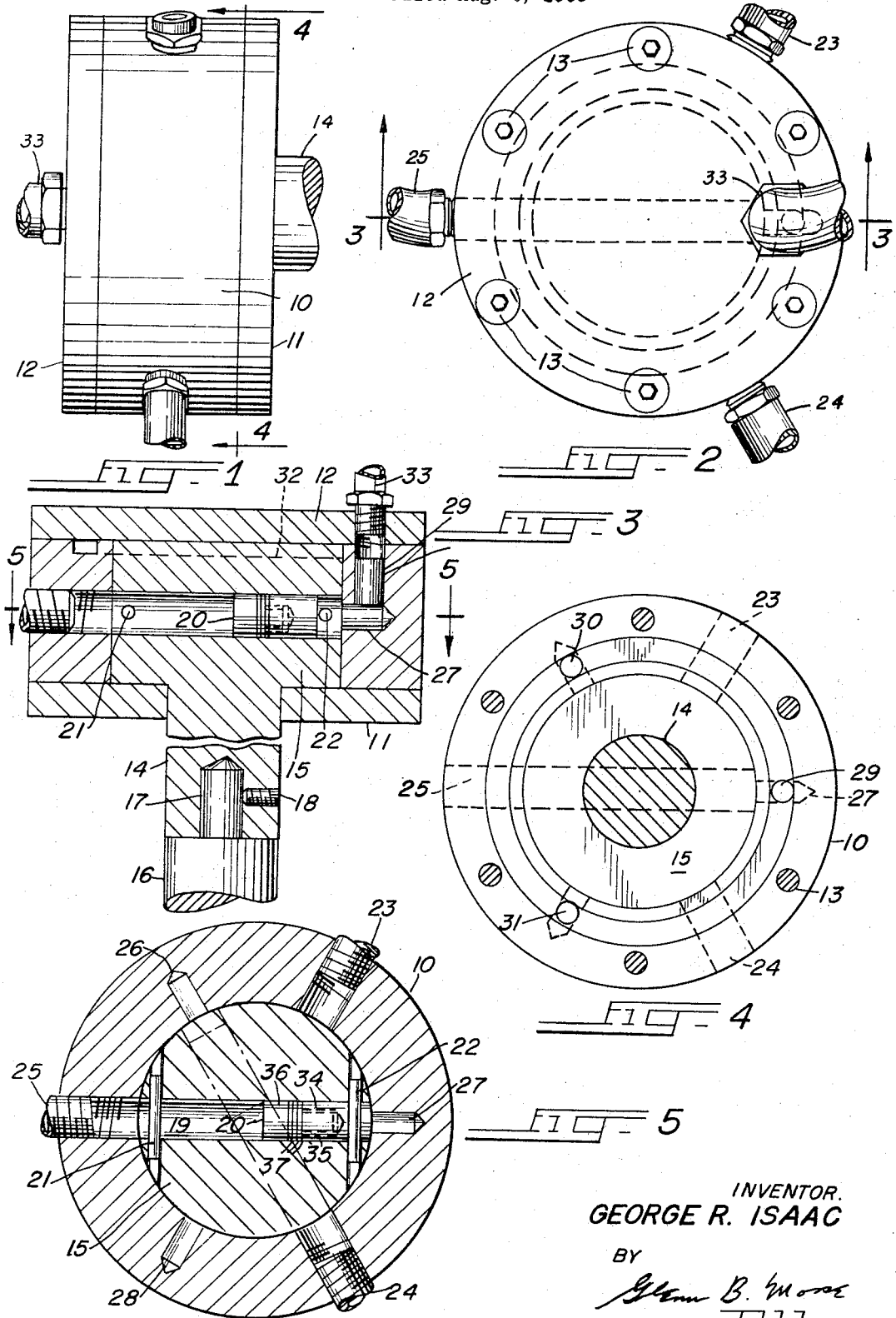
INVENTOR.
GEORGE R. ISAAC
BY
Glenn B. Morse
ATTY United States Patent Office 3,329,319
Patented July 4, 1967

3,329,319
DEVICE FOR DELIVERING MEASURED QUANTITIES OF FLUENT MATERIAL HAVING A DOUBLE ENDED EJECTOR
George R. Isaac, 1200 52nd SW., Wyoming, Mich. 49509
Filed Aug. 9, 1965, Ser. No. 478,139
1 Claim. (Cl. 222—219)

This invention provides a device for delivering measured quantities of flowable material, and the preferred form of the invention has been developed primarily as a metering lubricator. Many machines are equipped with central lubricating units, with tubes leading to the various bearings where the lubricant must be applied. The particular lubricant may be grease, oil, suspended graphite, or any combination of these. The difficulty with this equipment centers in the fact that probably no two of the bearings supplied by the central lubricating station will have the same resistance to receiving the lubricant. A loose bearing will obviously permit a relatively large quantity of lubricant to be discharged into it under a given pressure. A tighter bearing on the other hand, will provide relatively greater resistance; and correspondingly far less lubricant will be applied at the same pressure. Conventional lubricating devices merely apply lubricant under a given pressure either constantly, or intermittently for a predetermined period. In either case, the tighter bearings can easily be starved while the looser bearings are receiving an excess. It is obviously undesirable to deliver an excess of lubricant, as this material is wasted and merely flows out to contaminate the machine and the surrounding floor area.

The present invention provides a very practical solution to this problem by metering the delivered charge of lubricant to each of the bearings, so that the pressure may be selected to be adequate for any of the bearings. A loose bearing will nevertheless receive precisely the quantity of lubricant that has been predetermined, since the delivery of the lubricant is no longer a function of the resistance of the bearing against receiving it.

The several features of the invention will be analyzed in detail through discussion of the particular embodiment illustrated in the accompanying drawing. In the drawing:

FIGURE 1 is a side elevation of a metering lubricator incorporating the invention.

FIGURE 2 is an end view of the device shown in FIGURE 1.

FIGURE 3 is a section of the plane 3—3 of FIGURE 2.

FIGURE 4 is a section of the plane 4—4 of FIGURE 1.

FIGURE 5 is a section of the plane 5—5 of FIGURE 3.

The body portion of the device is formed by the cylindrical member 10 and the end plates 11 and 12. These plates are secured to the cylindrical member by bolts as shown at 13. The end plate 11 has an opening for rotatably receiving the stub shaft 14, which is preferably integral with the rotor 15. This rotor occupies substantially all of the space between the end plates 11 and 12 within the cylindrical member 10. Some convenient source of power is indicated by the drive shaft 16, having the extension 17 rotatively secured to the stub shaft 14 by the set screw 18. The rotor is driven in this manner at a predetermined and relatively slow speed of rotation.

The rotor 15 is provided with a diametral bore 19. A plug 20 is movable within this bore between the limit pins 21 and 22, which are driven in place in chordal holes in the rotor 15 which intersect the bore 19. The cylindrical portion 10 of the body of the unit is provided with peripherally spaced ports 23–25, which are tapped to receive the threaded ends of conventional piping. These ports are disposed with their axes in the same plane as the axis of the bore 19, this plane being perpendicular to the axis of the shaft 14. At points diametrically opposite from each of the ports 23–25, and coaxial with respect thereto the ports 26–28 intersect the interior of the member 10. These ports communicate with the axial passages 29–31 connecting with the annular groove 32 in an end face of the cylindrical member 10. The lubricant is delivered to the distributing unit under pressure via the fitting 33, which also communicates with the groove 32.

As the stub shaft 14 is rotated while pressure is being delivered throughout the fitting 33, an initial condition will be encountered as shown in FIGURE 3. When the rotation of the rotor 15 places the bore 19 in axial alignment with the ports 27 and 25, lubricant will flow through the passage 29 and the port 27, will enter the bore 19, and will drive the plug 20 to the left against pin 21. All of the bore 19 to the right of the plug 20 will then be filled with lubricant. Continued rotation of the rotor 15 will then place the opposite end of the bore 19 in communication with one of the ports communicating with the annular groove 32, and thus drive the plug against the limit pin 22. This action will result of delivering the quantity of lubricant between the plug and the limit pin 22 through the opposite delivery port. As the rotor 15 proceeds during a full revolution, it will successfully place the bore 19 in communication with pairs of ports which are oppositely oriented with respect to inlet and outlet so that the plug will be driven with a reciprocating movement between the pins 21 and 22, and will thus deliver a measured quantity of lubricant at each of the ports 23–25 during each rotation. The operation of the device may be controlled conveniently by a suitable timer, which will result in giving a single revolution to the unit at predetermined intervals, thus assuring that the bearing of the associated machine are properly lubricated.

Preferably, the plug 20 is constructed to permit some degree of variation in the delivered quantity of lubricant. The section 34 (refer to FIGURE 5) may be tapped to receive the threaded stem 35 of the section 36. A group of spacing washers 37 may be interposed to increase the overall length of the plug 20, without relying on maintaining an angular relationship between the portions 34 and 36. The washers 37 (or certain of them) may be in the form of lock washers to further assure that the portions 34 and 36 remain in angularly fixed positions. If lock washers are used, care should be taken that they do not project radially outward beyond the cylindrical periphery of the portions 34 and 36 to engage the wall of the bore 19.

The particular embodiments of the present invention which have been illustrated and discussed herein are for illustrative purposes only and are not to be considered as a limitation upon the scope of the appended claim. In this claim, it is my intent to claim the entire invention disclosed herein, except as I am limited by the prior art.

I claim:

A device for delivering measured quantities of flowable material, comprising:

a body having a cylindrical bore and an odd-numbered plurality of outlet ports constituting a first series of ports having the axes thereof in coplanar relationship, and also having a second series of inlet ports, a particular port of said second series being diametrically opposite from and coaxial with a particular one of the ports of said first series, said inlet and outlet ports positioned alternately about the body, said inlet and outlet ports communicating with said bore, said second series of ports communicating with a supply conduit;

a rotor rotatably received in said bore, and having a diametral passage disposed with the axis thereof coplanar with the axes of said inlet and outlet ports; and a plug slidably mounted in said diametral passage.

References Cited

UNITED STATES PATENTS

| 1,003,256 | 9/1911 | Hardy | 222—250 |
| 2,085,669 | 6/1937 | Noyes | 222—219 |
| 2,427,680 | 9/1947 | Leonard | 184—7 |
| 2,885,029 | 5/1959 | Burrell | 222—249 X |
| 3,172,578 | 3/1965 | Kemp | 222—219 |

WALTER SOBIN, *Primary Examiner.*